United States Patent
Vodermayer et al.

(10) Patent No.: US 6,589,377 B2
(45) Date of Patent: Jul. 8, 2003

(54) MANUFACTURE OF SECTIONS OF FIBER-PLASTIC COMPOUND MATERIALS

(75) Inventors: Albert Maria Vodermayer, Dietlikon (CH); Jens Kärger, Winterthur (CH); Hans Erlach, Winterthur (CH)

(73) Assignee: Arova Schaffhausen AG, Schauffhausen (CH)

(*) Notice: Subject to any disclaimer, the term of this patent is extended or adjusted under 35 U.S.C. 154(b) by 136 days.

(21) Appl. No.: 09/796,154

(22) Filed: Feb. 27, 2001

(65) Prior Publication Data

US 2001/0010248 A1 Aug. 2, 2001

Related U.S. Application Data

(62) Division of application No. 09/368,085, filed on Aug. 3, 1999, now Pat. No. 6,277,238.

(30) Foreign Application Priority Data

Aug. 11, 1998 (EP) .............................................. 98810769

(51) Int. Cl.[7] .............................................. B29C 47/18
(52) U.S. Cl. ..................... 156/73.2; 156/73.6; 156/180; 156/309.9; 264/135; 264/136
(58) Field of Search ................... 156/180, 433, 156/441, 73.1, 308.2, 309.9, 312, 73.2, 73.6; 264/134–137; 425/110, 124

(56) References Cited

U.S. PATENT DOCUMENTS

| 3,684,622 A | 8/1972 | Goldsworthy |
| 3,992,240 A | 11/1976 | Kuehn |
| 4,778,367 A | 10/1988 | Hilakos |
| 5,057,175 A | 10/1991 | Ashton |
| 5,336,526 A | 8/1994 | Spoo et al. |

FOREIGN PATENT DOCUMENTS

| EP | 0396198 A1 | 11/1990 |
| WO | WO 92/13706 | 8/1992 |

*Primary Examiner*—Sam Chuan Yao
(74) *Attorney, Agent, or Firm*—William Michael Hynes; Townsend and Townsend and Crew LLP

(57) ABSTRACT

The method for the manufacture of sections of fiber-plastic compound materials is carried out by means of at least one draw nozzle (10). In this nozzle, fibers (41) which are impregnated with flowable plastic (42) are formed under pressure to a product (41) with a predetermined cross-section and consolidated with the withdrawal of heat. The cross-sectional surface of the draw nozzle is periodically increased and decreased in time in its entire shape imparting region, with a value for the frequency of the oscillating cross-sectional surface being chosen less than 1 kHz, preferably less than 100 Hz.

9 Claims, 4 Drawing Sheets

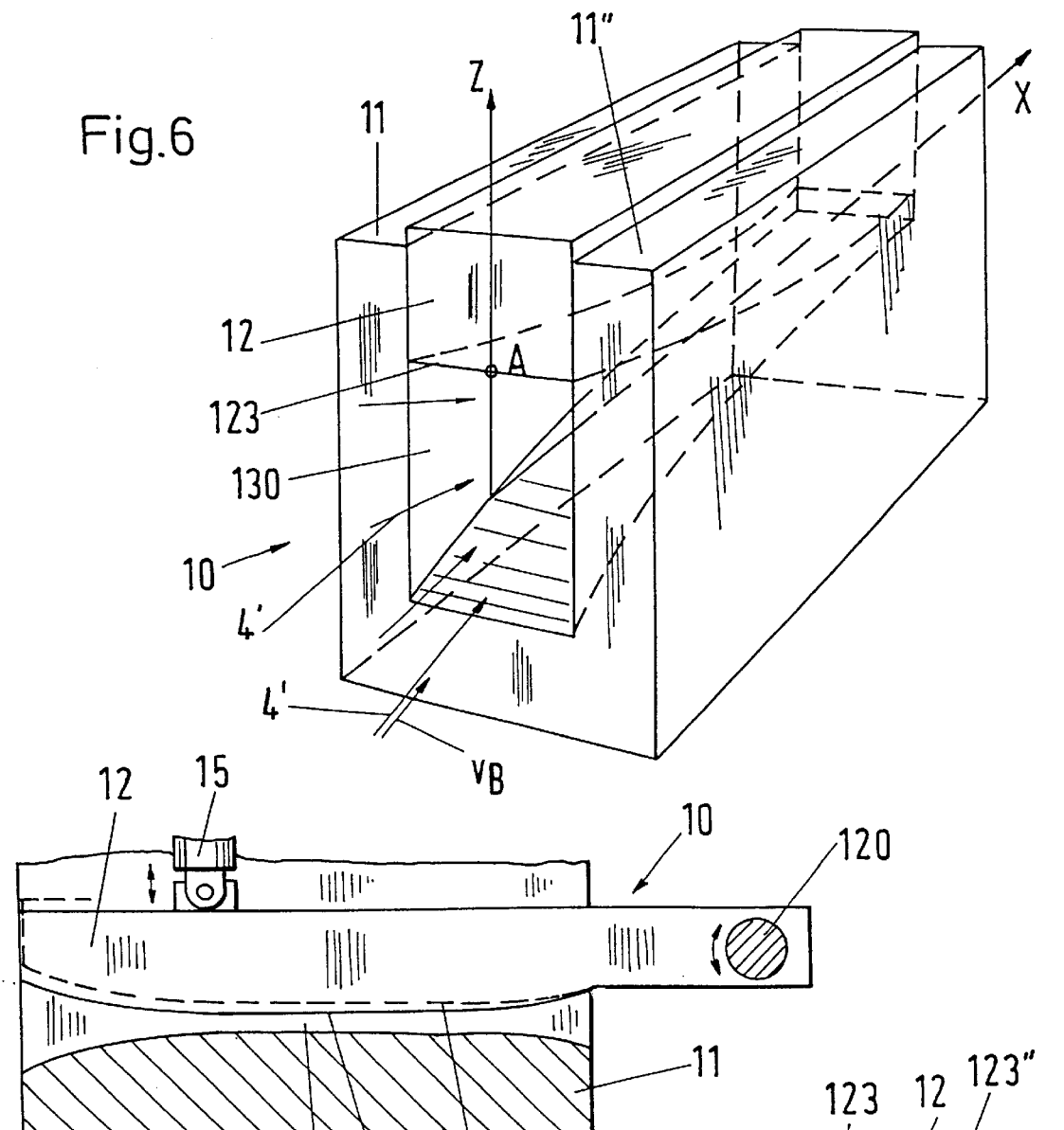
Fig.6
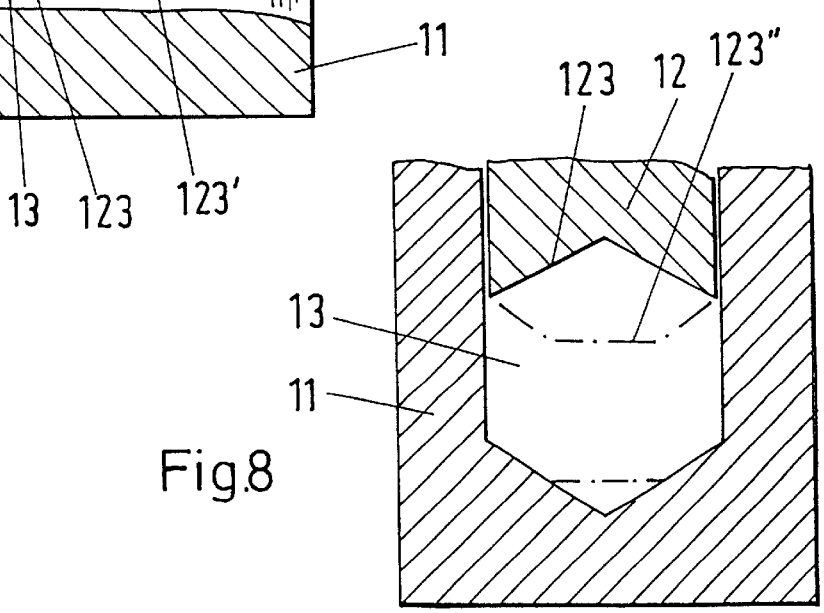
Fig.7
Fig.8

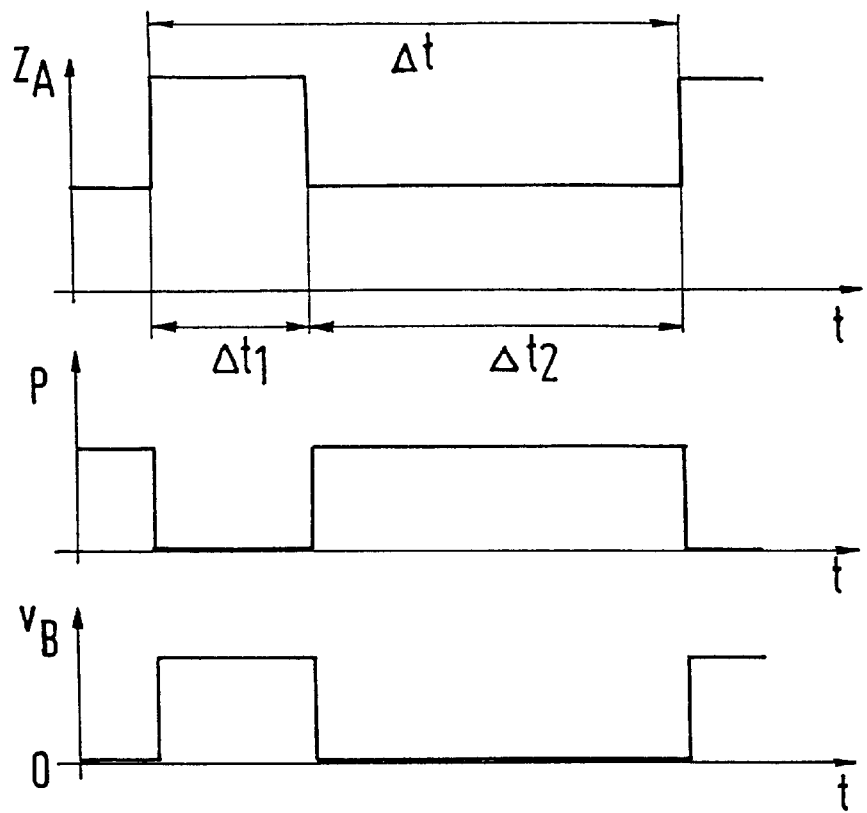
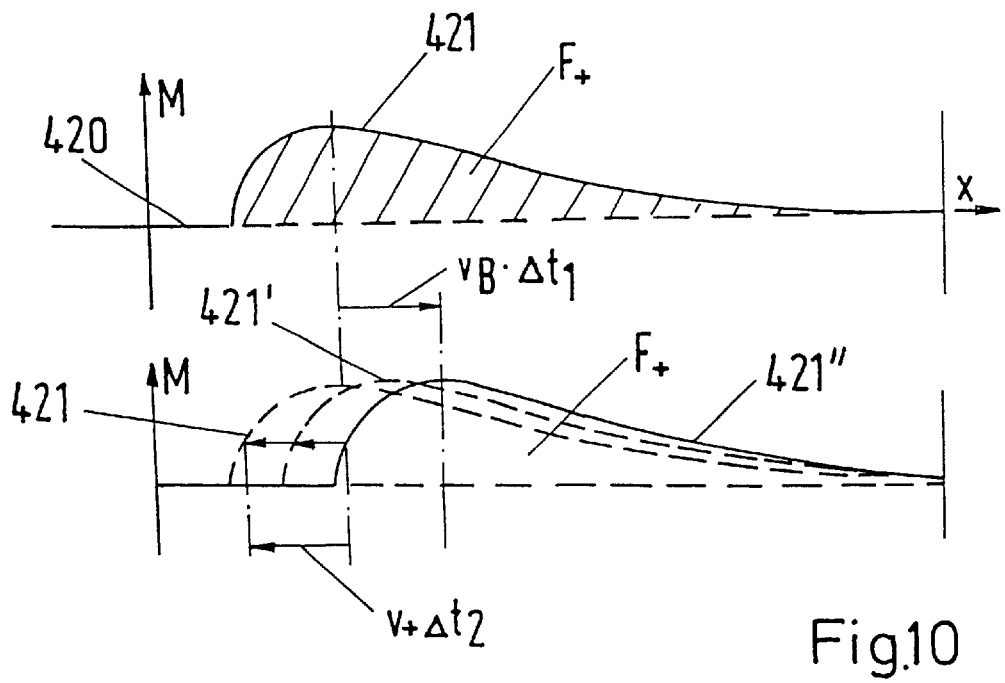

MANUFACTURE OF SECTIONS OF FIBER-PLASTIC COMPOUND MATERIALS

This application is a division of U.S. patent application Ser. No. 09/368,085, filed on Aug. 3, 1999, now U.S. Pat. No. 6,277,228 B1 which claims the priority of European Patent application 988107694, filed Aug. 11, 1998.

The invention relates to a method for the manufacture of sections of fiber-plastic compound materials by means of at least one draw nozzle in which fibers impregnated with flowable plastic are formed under pressure to a product with a predetermined cross-section and consolidated by the withdrawal of heat. A plant for carrying out the method is disclosed.

BACKGROUND OF THE INVENTION

By means of a continuous process, which is called pultrusion, sections can be manufactured of reinforcement fibers which are impregnated with plastics (see e.g. V. Kerbiriou "Imprägnieren und Pultrusion von thermoplastischen Verbundprofilen", VDI-Verlag, Düsseldorf 1997). The plastic is distributed between the fibers in the method in such a manner that a tight, pore-poor polymer matrix arises. The matrix consists of the plastic (matrix polymer) in the form of a largely homogeneous phase that is embedded between the fibers. As a starting product (semi-finished product) one advantageously uses bandlets, mixed fibers, powder impregnated fiber bundles or fiber bundles which are impregnated with flowable plastic which are manufactured from a compound material and which are already consolidated. Thermoplastics or duromers (to the extent that these are not yet hardened and are thus flowable) come under consideration for matrix polymers. In the pultrusion of compound materials with solid thermoplastics, for example the named bandlets, the plastics must first be melted. The fusion viscosity amounts to about 500 to 1000 Pa s. Known draw off speeds through a nozzle of the compound materials can be to up to 6 m/min. Greater speeds lead to losses in the pultrate quality as a result of faulty compression, insufficient distribution of the matrix polymer and/or fiber breakage.

A plant for carrying out a pultrusion comprises a supply device for the starting product, an oven, a nozzle (draw or shaping nozzle) and a draw off device, with the nozzle having a continuously narrowing cross-section in a shape-imparting region. The nozzle is slightly overfilled with the starting product so that a matrix flow-back within the fiber bed that is formed by the fibers takes place. The permeability of the fiber bed is anisotropic. The matrix flow takes place mainly along the fibers, but also transverse to the latter, through which the largely homogeneous distribution of the matrix polymer over the entire cross-section of the section that is to be achieved first results. Due to the matrix flow-back the fiber volume proportion increases in the nozzle and a surplus of plastic forms at the nozzle entry, which drips off there.

SUMMARY OF THE INVENTION

The object of the invention is to provide a method for the manufacture of sections of fiber-plastic compound materials, which permits a substantially higher production rate in comparison with known pultrusion methods. This object is satisfied in that the cross-sectional surface of the draw nozzle is periodically increased and decreased in time in its entire shape imparting region, with a value for the frequency of the oscillating cross-sectional surface being chosen to be less than 1 kHz, preferably less than 100 Hz.

The method for the manufacture of profiles of fiber-plastic compound materials is carried out by means of at least one draw nozzle. In this nozzle, fibers that are impregnated with flowable plastic are shaped under pressure to a product with a predetermined cross-section and consolidated with the withdrawal of heat. The cross-sectional surface of the draw nozzle is periodically increased and decreased in time in its entire shape imparting region, with a value for the frequency of the oscillating cross-sectional surface being chosen to be less than 1 kHz, preferably less than 100 Hz.

Various advantageous embodiments of the method in accordance with the invention are disclosed. A plant for carrying out the method is disclosed.

In the course of the method in accordance with the invention, phases during which the pressing is done with a narrow nozzle cross-section alternate periodically with phases during which the nozzle cross-section is expanded so that the pressing pressure is strongly reduced. At the beginning of the pressing phase the matrix component is relatively large; it subsequently decreases due to a matrix flow-back which is caused by the pressing. During the pressing phase the draw off forces are substantially lower in comparison with the known pultrusion when the comparison is made at the same draw off speeds. Therefore a greater draw off speed can be chosen in the method in accordance with the invention at which the draw off forces are just as large as in the known pultrusion. Also, at a thus increased draw off speed no loss of quality arises.

BRIEF DESCRIPTION OF THE DRAWINGS

The invention will be explained in the following with reference to the drawings. Shown are:

FIG. 6 is a perspective illustration of the shape imparting region of a draw nozzle in accordance with the invention;

FIG. 7 is a draw nozzle in accordance with the invention of which the movable part is designed to be pivotal;

FIG. 8 is a cross section through an alternate draw nozzle;

FIG. 9 has diagrams for the explanation of the method in accordance with the invention with reference to an idealized method, in which the drawing off is interrupted during a predetermined period;

FIG. 10 has diagrams corresponding to FIG. 9 with longitudinal fusion distributions in the fiber-plastic compound material during the reshaping in the draw nozzle in accordance with the invention;

DESCRIPTION OF THE SPECIFIC EMBODIMENTS

Figure 1:
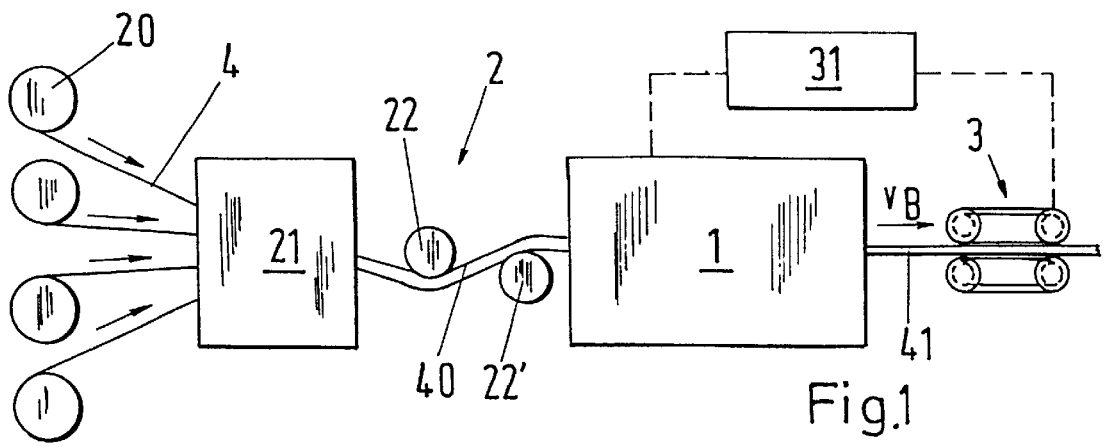
FIG. 1 is a plant for carrying out the method in accordance with the invention.

The plant which is schematically illustrated in FIG. 1 comprises a partial plant 1 that contains at least one draw nozzle, a partial plant 2 that supplies a starting product and a draw off device 3 for drawing off a produced section. The starting product consists of a large number of fiber reinforced bands 4 which are drawn off from supply rolls 20. These elements 4 of the starting product are heated up in an oven 21 by means of hot air or thermal radiation. The matrix polymer can in this be liquefied. In a region at the input side of the draw nozzle the thermoplastic temperature can be further influenced by a controlled heat exchange, for example further increased, so that a not yet melted matrix polymer liquefies. It can however also—if the matrix polymer is already present as a fusion at the nozzle input—be cooled so that during the compression and shaping a consolidation already begins from the direction of the section edges. The elements 4 of the starting product can be brought into contact with one another between the oven 21 and the draw nozzl of the partial plant 1 through deflection about pins 22, 22'. A thus produced strand 40 with elements 4 that adhere to one another is subsequently compressed and shaped in the nozzle.

A draw off speed vB, which is predetermined wit the draw off device 3, can be constant or designed to be variable corresponding to the periodically varying degree of opening of the draw nozzle. A control device 31 can be provide between the partial plant 1 and the draw off device 3 for the adjusting between a variable draw-off speed and the time dependent degree of opening of the draw nozzle.

Figure 2:
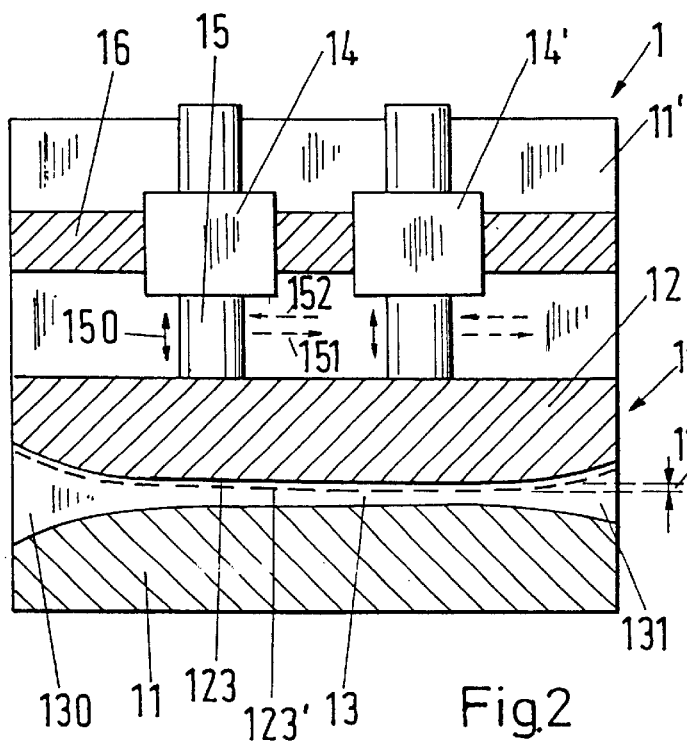
FIG. 2 is a longitudinal section through a draw nozzle in accordance with the invention.
Figure 3:
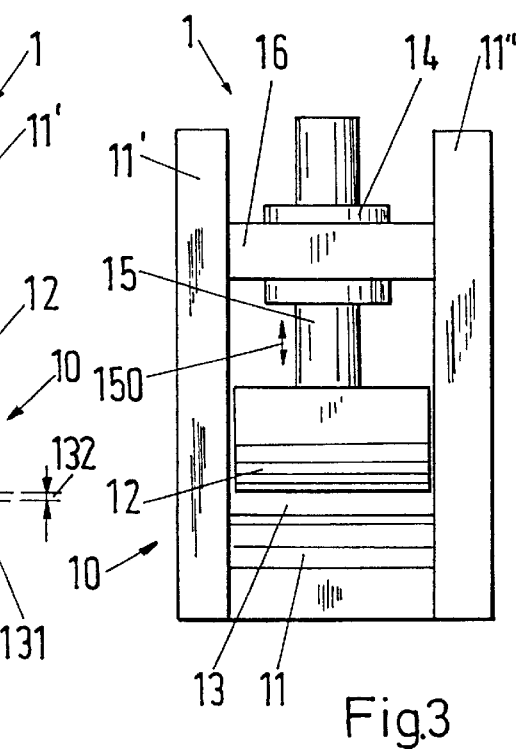
FIG. 3 is a front view of the same draw nozzle.

FIGS. 2 and 3 show a first embodiment of a draw nozzle 10 which is contained in the partial plant 1 of the plant in accordance with the invention of FIG. 1. The draw nozzle 10 is assembled from two mutually movable parts 11 and 12, which bound an inner space 13. The upper part 12 with the inner surface 123, 123' is designed to be movable. Two drives 14, 14' with bars 15 which are vertically displaceable by a travel 132 execute a transversal movement perpendicular to the draw off direction, namely a parallel displacement of the surface 123. The periodically varying nozzle cross-section oscillates between two states with cross-sectional surface which in each case remain largely constant, namely a state with a wide cross-section (surface 123 in the upper position) and a state with a narrow cross-section (surface 123' in the lower position). The drives 14, 14' produce transversal oscillation 150 with a frequency for which a value which is less than 1 kHz, for example 10 Hz, is chosen. This oscillation can for example be driven with a cam mechanism, with electromagnets or piezoelectrically. The drives 14, 14' are stably mounted on a carrier 16 between two side walls 11' and 11" which form a rigid unit with the lower nozzle art 11.

The inner space 13 of the nozzle 10 has an inlet 130 which contracts in the draw off direction and an outlet 131 which expands in the example shown. In the region of the inlet 130 a heater can be integrated in the wall of the nozzle 10. In the rear part the nozzle is designed as a cooler in which the produced section 41 (FIG. 1) s consolidated with a withdrawal of heat. The front part can also be designed as a cooler when a sufficient heating of the starting product 40 is provided in the oven 21.

The drives 14, 14' can also be designed in such a manner that a movement can be executed in which a longitudinal movement 151, 152 is superimposed on the transversal movement 150. This longitudinal movement 151 is directed in the draw direction (vB) when the nozzle is in the state with a narrow cross-section. The draw off movement can be assisted with a longitudinal movement 151, 152 of this kind.

Figure 4:
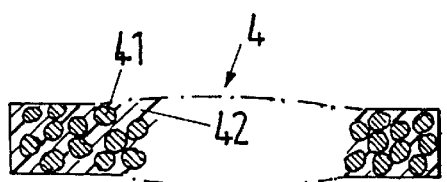
FIG. 4 is a cross-section through a fiber reinforced thermoplastic band.
Figure 5:
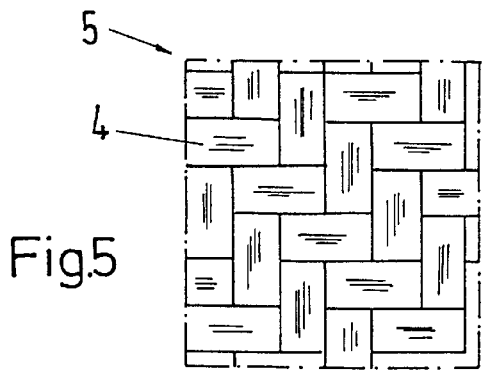
FIG. 5 is a mesh of such bands.

The cross-section illustrated in FIG. 4 through a undirectional fiber reinforced thermoplastic band 4 which is illustrated in FIG. 4 shows its inner structure with fibers 41 which form a fiber bed which is tightly impregnated with a polymer matrix. A mesh 5 assembled of such bands 4—see FIG. 5—can also be used as a starting product of the method in accordance with the invention.

FIG. 6 illustrates in perspective the inlet 130 with the adjoining shape imparting region 13 of the draw nozzle 10 in accordance with the invention. The U shaped lower part 11 forms with its flanks 11' and 11" a guide for the movable upper part 12 which is fitted in tightly but in a manner so as to be capable of sliding between the flanks 11, and 11". The arrows 4' indicate the supply of the starting material, which can be supplied from different directions with the speed vB. For the following explanations an x axis in the draw off direction, a z axis in the direction of the transversal movement and a point A at the input-side end of the inner surface 123 are indicated.

The transversal movement of the movable part 12 can also be a pivotal movement: see FIG. 7. The center of rotation of this pivotal movement in the center of the bearing 120 must be arranged at the output side at a distance from the narrowest nozzle cross-section. Thanks to this position of the center of rotation the nozzle cross-section contracts in the draw direction at any degree of opening, and at every position of the shape imparting nozzle region the nozzle cross-section is variable. Advantageously only one drive is provided (only drive rod 15 illustrated).

Sections of rectangular cross-section can be manufactured most simply. Other cross-sections are also possible, as is illustrated in FIG. 8: e.g. hexagonal or also—indicated in chain dotting—U shaped ones (inner surface 123" of part 12).

The method in accordance with the invention shall be explained with respect to the matrix flow-back with the diagrams of FIGS. 9 and 10 for an idealized method. In this idealized method the drawing off is interrupted during a predetermined duration of the period. The upper diagram of FIG. 9 represents the degree of opening of the draw nozzle by means of the z coordinate of the point A in FIG. 6, zA. During the first phase with the duration t1 the nozzle is in the state with a wide cross-section; during the remaining duration of the period t2, the nozzle is in the state with the narrow cross-section, thus the pressing phase, is present. The corresponding pressing pressure p is shown in the middle diagram. During the first phase no pressing is done; during the second, pressing is done with a constant pressure. The drawing off is illustrated—see lower diagram—as proceeding with constant speed vB for the state with the wide nozzle cross-section. During the pressing state the drawing off is stopped.

FIG. 10 shows corresponding diagrams for the distribution of the matrix proportion M in the fiber-plastic compound material in the x direction (cf. FIG. 6) along the shape imparting region of the nozzle. Prior to entry into the nozzle, M is constant, which is illustrated in the upper diagram of FIG. 10 with a horizontal line 420. As a result of the matrix flow-back there follows a region with an increased matrix proportion, which is illustrated with a curve piece 421. This curve piece 421 is intended to reproduce the matrix distribution at the end of the pressing phase. The hatched surface F+ corresponds to a surplus of matrix in the shape-imparting region of the nozzle. During the nozzle state with a wide cross-section the curve piece 421 is displaced in the x direction by the distance vB t1.

In the lower diagram of FIG. 10 the displaced curve piece is designated with the reference symbol 421". During the subsequent pressing phase this curve piece deforms as a result of the matrix flow-back. After a continuous passing through of intermediate forms 421', the shape 421, which is drawn in the upper diagram, results again at the end of the period. The above named diagram displacement $v_B\Delta t1$ corresponds to a backward moving displacement of the left flank of the curve piece 421" or 421' respectively by a distance v+ $\Delta t2$, with v+ signifying a flow-back speed. As one sees, a flow-back that is caused by the pressing is compensated by means of the displacement of the unpressed compound material during the first phase. Thus no matrix flow-back takes place on the time average.

The matrix surplus F+ is located in the shape-imparting region of the draw nozzle, thus at the place where reshaping forces arise. The surplus matrix acts as a lubricant so that the reshaping forces are reduced relative to those of a corresponding pultrusion with a nozzle cross-section that is held constant. It is thus sensible to continue the drawing off also during the pressing phase. Since the matrix surplus enables an increase of the draw off speed relative to the known pultrusion thanks to its lubricating action so that an acceleration of the method results.

Figure 11:
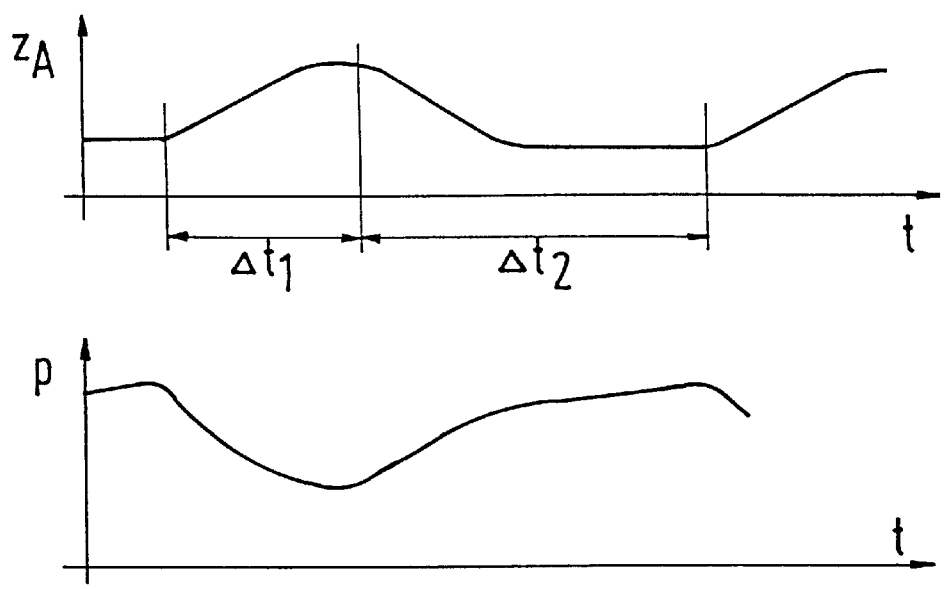
FIG. 11 has diagrams for a method in accordance with the invention in which the draw off speed is a constant; and, FIG. 12 is a draw nozzle with protective films.

FIG. 11 shows qualitatively and corresponding to FIG. 9 for a constant draw off speed vB how the pressing pressure p (lower diagram) varies in dependence on a variable degree of opening of the nozzle (upper diagram). Here a press shaping is also generally accomplished during the first phase. During the first phase, a surplus of matrix polymer is transported along in the draw off direction (x direction) thanks to the enlarged nozzle cross-section 50. On the average only a very slight matrix surplus or none at all arises.

By way of example, the manufacture of a section from unidirectional carbon fiber reinforced thermoplastic bands (CFK/IPA12) with vB=10 m/min (=const) and at a frequency of 10 Hz can be used. In this example, the shape-imparting region of a nozzle is held at 240° C. From a static pressing experiment (with 7 bands, each 0.8 mm thick, 15 mm wide, fiber content 65 vol %, pressure 10 bar) it is known that for the pressing time duration of about 2 s is required. The pressing phase extends over about ⅔ of the period, which lasts 0.1 s. From these data it can be derived that the desired length of the nozzle must amount to about 500 mm.

In the illustrated exemplary embodiments only the upper part of the draw nozzle is designed to be movable. The lower part could also be movable in addition and be provided with a separate drive. In a mirror-imaged construction of the nozzle and nozzle parts that are moved in a contrary manner, possible problems with excitable eigen-frequencies of the nozzle arrangement (nozzle and frame) can be circumvented.

It is particularly advantageous when an ultrasonic oscillation with a frequency of grater than 10 kHz is superposed on the nozzle of the plant in accordance with the invention with an additional drive. From for example U.S. Pat. No. 5,091,036 it is known that the ultrasonic oscillation improves the flowing of the matrix polymer so that the pultrusion is favorably influenced.

Instead of a single draw nozzle a plurality of draw nozzles which are placed one after the other can also be used for a multi-stage reshaping process. This is required in the manufacture of complicated section shapes.

Figure 12:
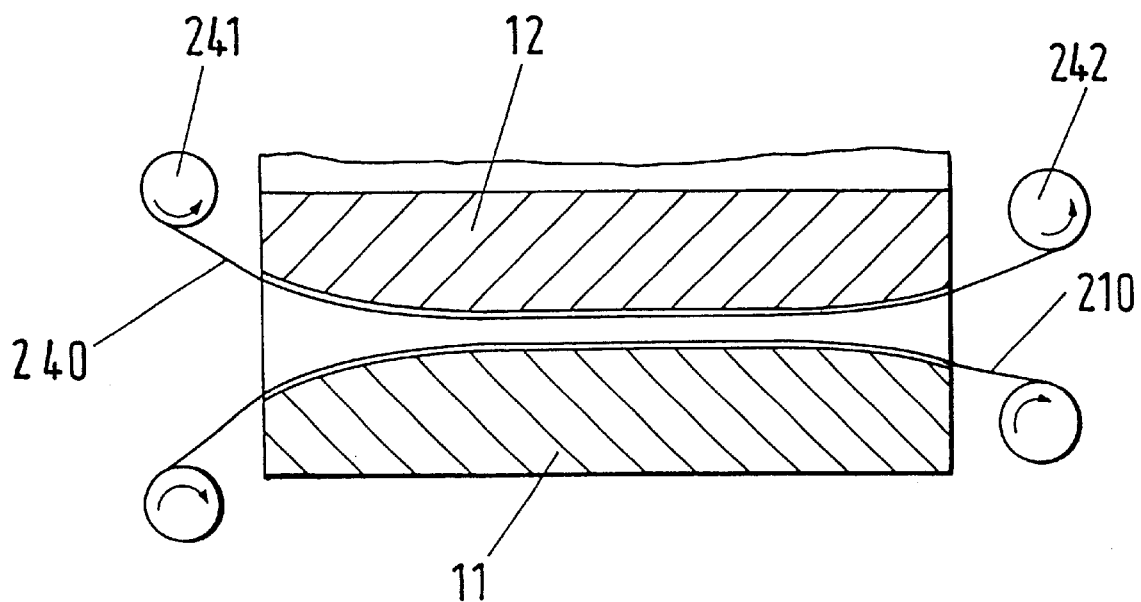

In an additional heating of the product in the nozzle there is the danger that the melted matrix polymer sticks to the surface of the shaping nozzle region. As is indicated in FIG. 12, a sticking of the product can be prevented by means of co-moving protective films 240 (rolls 241, 242). In the method in accordance with the invention protective films of this kind can be relatively easily employed in contrast to the known pultrusion methods.

Advantageously a periodic variation of the nozzle cross-section between two states with a cross-sectional surface that remains largely constant in each case takes place in the method in accordance with the invention. The speed with which the product is drawn through the nozzle can be held approximately constant. Or this product speed can be varied in dependence on the state of the cross-section and indeed in such a manner that the speed at a wide cross-section is substantially greater, in particular by at least a factor of two, than at a narrow cross-section. In a largely constant product speed a shorter duration t1 (FIG. 11) is advantageously predetermined for the phase in which the cross-section expands or the state with the wide cross-section is present than for the duration t2 of the complementary phase, which forms the remaining part of the period.

In the described exemplary embodiments the draw nozzles contract in the direction of the oscillation, i.e. the direction of movement of the movable part. The nozzle can however also be designed in such a manner that a contraction transverse to the oscillation direction is present.

What is claimed is:

1. A method for the manufacture of profiles of fiber-plastic compound materials including the steps of:
   providing a supply of fibers (41) impregnated with a flowable plastic (42);
   providing an oven (21) for heating the fibers (41) and impregnated flowable plastic (42);
   providing at least one drawing nozzle (10) having a continuously narrowing cross-section in a shape-imparting region, the drawing nozzle having first and second relatively movable parts which define between them the continuously narrowing cross-section, one of the relatively movable parts being movable to vary the continuously narrowing cross-section of the at least one drawing nozzle (10);
   providing a draw-off device for continuously passing the material from the supply of fibers (41) impregnated with flowable plastic (42) through the oven (21) and through the drawing nozzle (10) without interrupting the drawing off;
   providing at least one drive for transversely moving perpendicular to the draw direction of the fibers (41) the movable part of the at least one drawing nozzle (10) relative to the other part of the at least one drawing nozzle (10); and
   forming the fibers (41) and flowable plastic (42) in the shape-imparting region of the at least one drawing nozzle (10) during the drawing off by operating the at least one drive for the transverse movement perpendicular to the draw direction of the fibers (41) impregnated with flowable plastic (42) by increasing and decreasing the cross-sectional surface of the at least one drawing nozzle (10) at a frequency less than 1 kHz.

2. The method for the manufacture of profiles of fiber-plastic compound materials according to claim 1 and including the further step of:
   forming the fibers (41) and flowable plastic (42) to provide a surplus of flowable plastic whereby a lubricant is formed at the shape-imparting region of the at least one drawing nozzle (10) to reduce the force of drawing off.

3. The method for the manufacture of profiles of fiber-plastic compound materials according to claim 1 and wherein:

providing fibers (41) includes providing reinforced thermoplastic bands (4).

4. The method for the manufacture of profiles of fiber-plastic compound materials according to claim 1 and wherein:

providing fibers (41) includes providing meshes (5) of reinforced thermoplastic bands (4).

5. The method for the manufacture of profiles of fiber-plastic compound materials according to claim 1 and including:

heating fibers (41) and flowable plastic (42) in the oven (21) so that the flowable plastic (42) liquefies prior to placing the heated fibers (41) and flowable plastic (42) in the at least one drawing nozzle (10).

6. The method for the manufacture of profiles of fiber-plastic compound materials according to claim 5 and including:

heating fibers (41) and flowable plastic (42) in the oven (21) by means of hot air.

7. The method for the manufacture of profiles of fiber-plastic compound materials according to claim 5 and including:

heating fibers (41) and flowable plastic (42) in the oven (21) by means of thermal radiation.

8. The method for the manufacture of profiles of fiber-plastic compound materials according to claim 1 an including:

providing a plurality of separate fibers (41) impregnated with a flowable plastic (42);

heating the plurality of separate fibers (41) and flowable plastic (42) in the oven (21); and bringing the plurality of separate fibers (41) impregnated with the flowable plastic (42) together after heating in the oven (21).

9. The method for the manufacture of profiles of fiber-plastic compound materials according to claim 1 and including:

forming the fibers (41) and flowable plastic (42) in the shape-imparting region; and operating the at least one drive by increasing and decreasing the cross-sectional surface of the at least one drawing nozzle (10) at a frequency less than 1 kHz including superimposing an ultrasonic oscillation greater than 10 kHz on said frequency less than 1 kHz.

* * * * *